(12) United States Patent
Turner

(10) Patent No.: US 7,107,848 B2
(45) Date of Patent: Sep. 19, 2006

(54) ACTIVE SCAN VELOCITY CONTROL FOR TORSIONAL HINGED MEMS SCANNER

(75) Inventor: Arthur Monroe Turner, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 118 days.

(21) Appl. No.: 11/004,457

(22) Filed: Dec. 3, 2004

(65) Prior Publication Data

US 2006/0117854 A1    Jun. 8, 2006

(51) Int. Cl.
*G01N 29/036* (2006.01)
(52) U.S. Cl. .............................. 73/579; 73/649; 73/657
(58) Field of Classification Search ................. 73/579, 73/600, 649, 655, 657; 310/330, 338, 335, 310/342
See application file for complete search history.

(56) References Cited

U.S. PATENT DOCUMENTS 6,624,549 B1 * 9/2003 Takeuchi et al. ............ 310/330
6,687,132 B1 * 2/2004 Orcutt et al. ................ 361/760
6,900,918 B1 * 5/2005 Orcutt et al. ................ 359/224
6,931,698 B1 * 8/2005 Takeuchi et al. ........... 29/25.35
6,965,177 B1 * 11/2005 Turner et al. ................. 310/38

* cited by examiner

*Primary Examiner*—Hezron Williams
*Assistant Examiner*—Jacques M Saint-Surin
(74) *Attorney, Agent, or Firm*—William B Kempler; W. James Brady; Frederick J. Telecky, Jr.

(57) ABSTRACT

System and method for adjusting an operational parameter of a component that drifts with temperature changes. The system includes a torsional hinged device that oscillates at a resonant frequency, and the resonant frequency of the device drifts or varies with temperature. Differences of a selected parameter between a drive signal and the actual selected parameter are monitored to determine changes in the resonant frequency. An output signal representative of change in the resonant frequency is used to adjust another component that also has a parameter that varies with temperature changes. The adjustment compensates for the temperature drift.

16 Claims, 1 Drawing Sheet

ACTIVE SCAN VELOCITY CONTROL FOR TORSIONAL HINGED MEMS SCANNER

TECHNICAL FIELD

The present invention relates generally to apparatus and methods for compensating for temperature drift in a system and more particularly to using the changes in the resonant frequency of a torsional hinged device for adjusting a parameter of a second temperature sensitive component of the system in response to changes in the resonant frequency of the torsional hinged device.

BACKGROUND

Torsional hinged devices, such as mirrors, are readily driven to and easily maintained at the natural resonant frequency of the device with minimal energy. Therefore, a torsional hinged mirror for example provides an inexpensive and highly reliable beam scanning engine for laser printers and displays. Unfortunately, such printers and/or displays often generate excessive heat and at the same time require a very stable beam scanning amplitude and frequency. Since the resonant frequency of torsional hinged mirrors varies noticeably with temperature changes, significant attention must be paid to restricting the thermal loading and/or temperature changes experienced by the torsional hinged mirror.

On the other hand, since the resonant frequency of the mirror can readily and precisely be determined and since the changes in resonant frequency due to changes in temperature are repetitive, the changes in the resonant frequency can be used to adjust the performance of other temperature sensitive components in the display or printer system to compensate for performance changes due to temperature variation.

SUMMARY OF THE INVENTION

These and other problems are generally solved or circumvented, and technical advantages are generally achieved, by preferred embodiments of the present invention, which comprise apparatus and method for adjusting an operational parameter of a system that varies with temperature changes. The methods and apparatus comprise a torsional hinged device that oscillates at a resonant frequency and wherein the resonant frequency of the device varies with changes in temperature. There is also included a sensor, such as a piezoelectric element, an optical element or the like, for monitoring a parameter, such as the scan position of the oscillation device. A drive mechanism provides a drive signal that causes resonant motion of the torsional hinged resonant device and also monitors or compares a parameter of the drive signal at the nominal temperature, such as position phase shift or rotational amplitude, with the actual resonant parameter of the torsional device and provides a signal representative of differences between the two. This signal is then provided to at least one other component that also has a parameter that drifts with temperature and that can receive an input signal for adjusting the drifting parameter. The component then receives the signal representative of the change in resonant frequency and adjusts the drifting component or components to compensate for parameter changes due to temperature variations.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
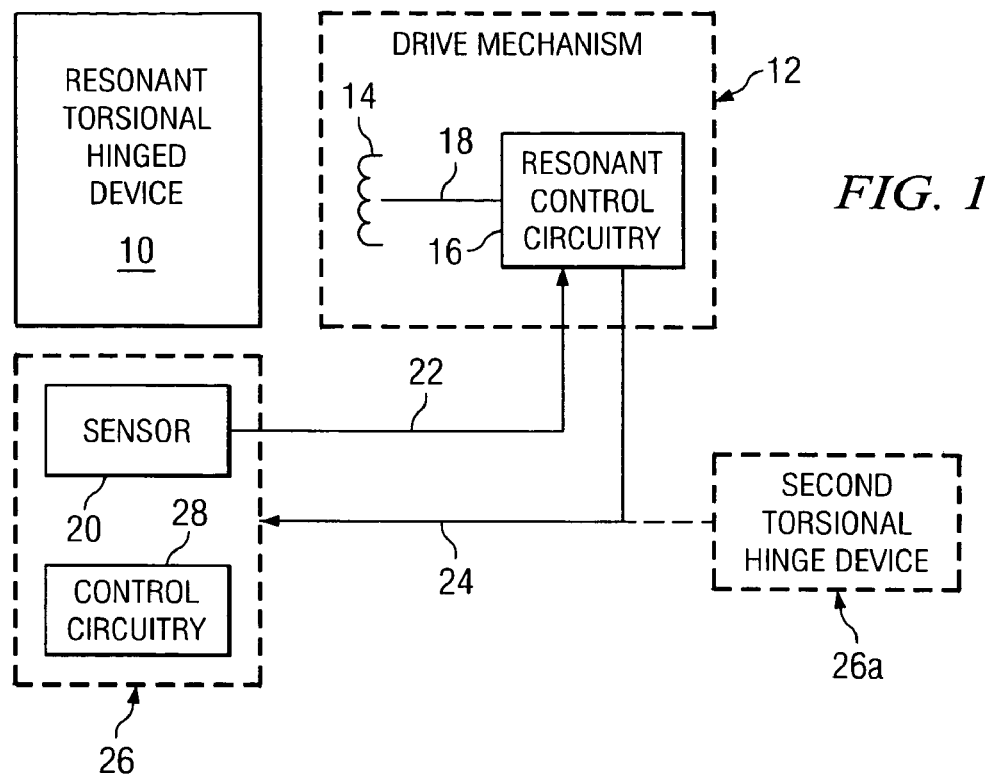
FIG. 1 is a generalized circuit diagram of the compensation apparatus of the present invention.

Referring now to FIG. 1, there is shown a block diagram of the temperature compensation system of the present invention. As shown, there is included a torsional hinged device 10 that oscillates at a resonant frequency about an axis. As an example, a pivotally oscillating mirror at a resonant frequency may be used to provide the sweeping light beam in the drive engine of a display system or laser printer. More specifically, as will be appreciated by those skilled in the art, a light beam may be reflected from a torsional hinged mirror as it sweeps or pivots back and forth at it's resonant frequency. When used with a printer, the sweeping light beam is modulated and reflected onto a moving photosensitive medium to generate parallel print lines or images on the medium. Alternately, when used for a display device, the sweeping light beam may also be moved orthogonally to the sweeping motion to separate or space the lines so as to create the print lines or images on a display screen. Also as show in FIG. 1, there is included a drive mechanism 12 comprising, for example, a drive coil 14. The drive mechanism 12 includes circuitry 16 for generating a drive signal on line or connection 18. The drive signal on connection or line 18 will typically be an AC signal or a pulse signal having a frequency selected to be equal to the resonant frequency of the torsional hinged device 10 at the nominal operating temperature. However, as will be appreciated by those skilled in the art, the resonant frequency of a torsional hinged device will typically vary as a function of temperature. For example, torsional hinged mirrors are typically manufactured from Si (silicon) and the Young's modulus of Si will vary with temperature, which will produce a shift in the resonant frequency. In addition, a temperature change will produce slight geometry changes in the package and hinge materials due to the different coefficients of thermal expansion. These changes may stress the torsional hinges and cause a sufficient change in the resonant frequency of the device such that the selected frequency of the provided drive signal or drive pulse is no longer the same as the resonant frequency of the device.

In addition to providing the output drive signal on line 18, and according to the present invention, circuitry 16 also monitors a selected parameter of the sensor circuitry 26, such as for example, phase shift or rotational amplitude. As an example, the actual phase shift or rotational amplitude of the resonant device 10 may be determined by selecting sensor 20 to be a light sensor or a piezoelectric device. Sensor 20 then provides a signal indicative of the selected parameter (i.e., the actual phase shift or rotational amplitude) to drive mechanism 12 on line 22. The signal on line 22 representing the monitored selected parameter of the sensor 20 is then used to set the frequency of the drive signal to the actual resonance frequency for the current ambient conditions. This can be accomplished using one of two methods.

According to a first method, the phase of the mirror's motion can be compared to the phase of the drive. Because the scanning mirror 10 is a high Q resonant device it will undergo a rapid phase shift of mirror motion relative to drive waveform. At resonance the mirror motion (as monitored by rotational amplitude) will be 90 degrees out of phase with the drive waveform. If the mirror drive frequency is, for example, below the resonance frequency then the phase difference between the rotational amplitude and drive waveform will be displaced from 90 degrees and the direction of phase offset indicates the drive frequency must be increased to approach resonance. Of course, if the mirror drive frequency is above the resonant frequency, the direction of phase shift offset will indicate that the drive frequency must be decreased. The drive frequency is adjusted in this manner until the phase offset is 90 degrees and the drive frequency is equal to the resonance frequency.

According to the second method, the drive frequency is set to a value close to the resonant frequency. As an example only, the frequency may be set to the last known value or one that is in the middle of the expected range. The drive control circuitry 16 then reads the rotational amplitude signal 22. It will be appreciated by those skilled in the art that torsional resonant mirrors have the property that the rotational amplitude of the mirror will be at a maximum for any given drive power if the drive frequency is equal to the resonance frequency. The drive control circuitry 16 then shifts the drive frequency a given amount. The rotational amplitude signal 22 is then re-sampled and compared to the initial value. If the rotational amplitude increased then the shifted drive frequency is closer to resonance than the original drive frequency. If the rotational amplitude decreased then the shifted drive frequency is farther from resonance than the original drive frequency. This drive frequency shift and rotational amplitude read can be repeated with progressively smaller drive frequency shifts to adjust the drive frequency to the resonance frequency with the desired accuracy.

Once the actual resonant frequency has been determined for the ambient operating conditions, then this frequency value can be compared to a reference frequency for this mirror previously measured at a set temperature that was determined as part of the acceptance test at the last stage of mirror manufacturing or as part of the system acceptance calibration and acceptance testing. The frequency offset or difference is input into a mathematical formula or compared to a look up table to determine the actual temperature at the mirror 10. The sensor output 22 can then be adjusted by the sensor control circuitry 28 and corrected for temperature drift. It should be appreciated that the properties of the sensor output 22 used as feedback to establish the resonance frequency are not dependent on proper amplitude calibration of the sensor unit 26 but depend only on the phase or relative amplitude of the sensor output 22.

Thus as shown in FIG. 1, there is included a second component that drifts or has a parameter that drifts with changes in temperature, and that could benefit advantageously by adjusting or compensating for the temperature drift. As an example only, the drifting component could be the resonant frequency of a second torsional hinged device 26*a* such as a second torsional hinged mirror for providing orthogonal motion to a sweeping light beam, such as shown in dashed lines. Alternatively as show in solid lines in FIG. 1 and as discussed above, the drifting component 26 could even be the output of the scan position sensor 20. In any event, the second drifting component 26(26*a*) will be adapted for receiving an input signal that adjusts the component, such as for example the sensor 20 output, so as to compensate for the temperature drift. Thus, it is seen that the output signal on line 24 from drive mechanism 12 may be connected to the drifting component 26(26*a*) as an input adjust signal. For example, as shown in FIG. 1, the signal received on line 24 is received by the control or bias circuitry 28 to adjust the output of sensor 20 in response to changes in temperature.

Figure 2:
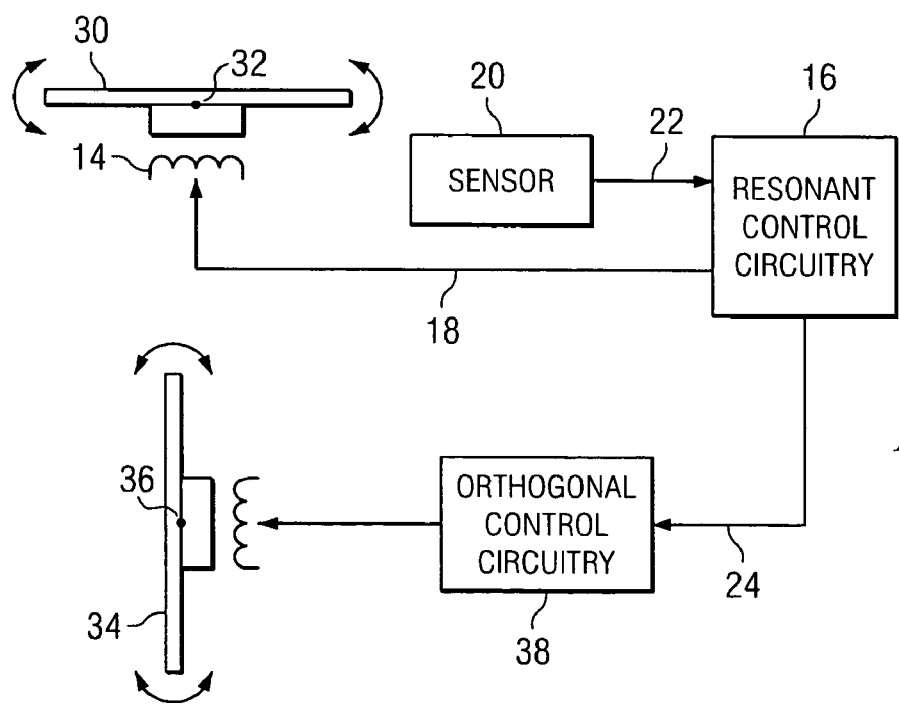
FIG. 2 is a circuit diagram of the compensation apparatus of the present invention wherein the torsional hinged device is a resonant scanning mirror and the drifting component is a non-resonant pointing mirror.

Referring to FIG. 2, there is shown an embodiment of the invention wherein the first torsional hinged device is a torsional hinged resonant mirror 30 that oscillates at a resonant frequency around axis 32. There is also included a second torsional hinged device such as the second torsional hinged mirror 34 that pivots about axis 36 and is used to provide orthogonal movement to the sweeping light beam. The second torsional hinged mirror 34 may also be a resonant mirror having a much slower resonant frequency. In any event, the orthogonal drive control circuitry 38 of the second resonant mirror 34 has an input so that it may be adjusted to compensate for temperature drifts whether or not the second mirror is at it's resonant frequency or off of it's resonant frequency.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, means, methods, or steps.

What is claimed is:

1. Apparatus for adjusting an operational parameter that varies with temperature changes, said apparatus comprising:

a first torsional hinged device that oscillates at a resonant frequency, said resonant frequency varying with the temperature;

a sensor for monitoring and for providing a signal representative of a selected parameter of said oscillating device;

a drive mechanism for providing motion to the first torsional hinged device and for receiving said signal representative of said selected parameter of the torsional hinged device to determine changes in said resonant frequency and to provide an output signal indicative thereof;

a component having a parameter that drifts with temperature and has an input connection for receiving an input signal that adjusts said drifting parameter; and a feedback circuit connected to said input of said component for providing said signal indicative of changes in the resonant frequency of said torsional hinged device as said input signal to adjust said component so as to compensate for said drift due to temperature changes.

2. The apparatus of claim 1 wherein said sensor provides scan phase information and said drive mechanism provides motion to the first torsional hinged device and compares the phase shift between a drive signal, generated by said mechanism, and the scan phase information.

3. The apparatus of claim 1 wherein said sensor provides rotational amplitude information and said drive mechanism provides motion to the first torsional hinged device and monitors the maximum rotational amplitude of the torsional hinged device versus drive frequency.

4. The apparatus of claim 1 wherein said drive mechanism includes an electromagnetic coil for causing oscillations in said torsional hinged device in response to said drive signal.

5. The apparatus of claim 1 wherein said component is a second torsional hinged device.

6. The apparatus of claim 3 wherein said second torsional hinged device is not operating at its resonant frequency.

7. The apparatus of claims 1 wherein the first torsional hinged device is a scanning mirror and the component that drifts with temperature is a second torsional hinged mirror used to provide orthogonal movement to a beam of light reflected by said scanning mirror.

8. The apparatus of claim 1 wherein said component is said sensor for monitoring said selected parameter of said oscillating device.

9. The apparatus of claim 8 wherein said component is a piezoelectric element.

10. The apparatus of claim 8 wherein said input signals adjust said sensor to change the sensor output.

11. A method for adjusting an operational parameter that varies with temperature comprising the steps of:

monitoring a selected scan parameter of a torsional hinged device having a resonant frequency;

comparing said selected parameter of the signal driving said torsional hinged device and said monitored selected parameter of said oscillating torsional hinged device;

determining differences in the resonant frequency from said comparison of said selected parameter and providing a signal indicative thereof;

providing a component having a parameter that drifts with temperature and wherein said component can be adjusted by an input signal; and providing said signal indicative of changes in said resonant frequency to adjust said drifting component to compensate for drift due to temperature.

12. The method of claim 11 wherein said step of monitoring a selected parameter of said torsional hinged device comprises the step of monitoring a torsional hinged mirror oscillating at its resonant frequency.

13. The method of claim 11 wherein said component having a parameter drift is a second torsional hinged mirror.

14. The method of claim 11 wherein said step of monitoring said selected parameter comprises the step of mounting a piezoelectric element that is variably stressed as said scan position varies and providing the output of said piezoelectric as said provided signal indicative of said differences in the resonant frequency.

15. The method of claim 11 wherein said differences of a selected parameter comprises variation in the phase between said signal driving the torsional hinged device and the monitored scan position.

16. The method of claim 11 wherein said differences of a selected parameter comprises variations in the rotational amplitude between said signal driving the torsional hinged device and the monitored scan position.

* * * * *